United States Patent
Huang et al.

(10) Patent No.: US 8,169,598 B2
(45) Date of Patent: May 1, 2012

(54) RANGEFINDER

(75) Inventors: Sing-Hung Huang, Taichung (TW); Hua-Tang Liu, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 12/981,863

(22) Filed: Dec. 30, 2010

(65) Prior Publication Data
US 2011/0164241 A1 Jul. 7, 2011

(30) Foreign Application Priority Data

Jan. 4, 2010 (TW) .............................. 99100007 A

(51) Int. Cl.
*G01C 3/08* (2006.01)
(52) U.S. Cl. ....................................... 356/4.01
(58) Field of Classification Search .................. None
See application file for complete search history.

(56) References Cited

U.S. PATENT DOCUMENTS

| 2,495,288 | A | * | 1/1950 | Richards | 396/331 |
|---|---|---|---|---|---|
| 3,123,915 | A | * | 3/1964 | Wilkinson | 356/21 |
| 3,297,389 | A | * | 1/1967 | Gibson | 359/424 |
| 3,953,869 | A | * | 4/1976 | Wah Lo et al. | 396/327 |
| 4,090,780 | A | * | 5/1978 | Davis | 359/826 |
| 4,139,268 | A | * | 2/1979 | Litman | 359/825 |
| 4,300,823 | A | * | 11/1981 | Yamanaka et al. | 396/106 |
| 4,313,654 | A | * | 2/1982 | Matsui et al. | 396/106 |
| 4,380,395 | A | * | 4/1983 | Kuniyoshi et al. | 356/401 |
| 4,403,421 | A | * | 9/1983 | Shepherd | 42/122 |
| 4,584,776 | A | * | 4/1986 | Shepherd | 42/122 |
| 5,020,892 | A | * | 6/1991 | Glover et al. | 359/399 |
| 5,057,681 | A | * | 10/1991 | Beder et al. | 250/208.2 |
| 5,181,323 | A | * | 1/1993 | Cooper | 42/122 |
| 5,375,072 | A | * | 12/1994 | Cohen | 702/94 |
| 5,602,613 | A | * | 2/1997 | Akimoto et al. | 396/133 |
| 5,673,099 | A | * | 9/1997 | Haraguchi et al. | 396/379 |
| 5,771,595 | A | * | 6/1998 | Bell | 42/122 |
| 5,924,234 | A | * | 7/1999 | Bindon et al. | 42/123 |
| 6,005,711 | A | * | 12/1999 | Mai et al. | 359/424 |
| 6,279,259 | B1 | * | 8/2001 | Otteman | 42/122 |
| 6,392,744 | B1 | * | 5/2002 | Holec | 356/4.03 |
| 6,517,484 | B1 | * | 2/2003 | Wilk et al. | 600/437 |
| 6,621,986 | B2 | * | 9/2003 | Karbe et al. | 396/141 |
| RE40,429 | E | * | 7/2008 | Oliver et al. | 42/116 |
| 7,530,193 | B2 | * | 5/2009 | Williamson et al. | 42/145 |
| 2002/0075471 | A1 | * | 6/2002 | Holec | 356/3.01 |
| 2002/0089742 | A1 | * | 7/2002 | Otteman | 359/423 |
| 2003/0102431 | A1 | * | 6/2003 | Gaber | 250/330 |
| 2003/0147639 | A1 | * | 8/2003 | Karbe et al. | 396/141 |
| 2007/0137089 | A1 | * | 6/2007 | William et al. | 42/122 |

(Continued)

*Primary Examiner* — Gregory C. Issing
*Assistant Examiner* — Antoine J Bedard
(74) *Attorney, Agent, or Firm* — Thomas|Kayden

(57) ABSTRACT

A rangefinder. A main body includes a first end and a second end opposite to the first end. The second end includes at least one guide bar. A receiving lens is connected to the first end of the main body. A first adjusting wheel and a second adjusting wheel are rotatably connected to the second end of the main body. A movable board is movably fit on the guide bar of the second end of the main body and is disposed between the first and second adjusting wheels. A receiving member is connected to the movable board, receiving light beams received by the receiving lens. The movable board is moved by rotation of the first and second adjusting wheels, driving the receiving member to move on an optical axis.

4 Claims, 2 Drawing Sheets

U.S. PATENT DOCUMENTS

| | | | |
|---|---|---|---|
| 2008/0204699 A1* | 8/2008 | Benz et al. | 356/4.01 |
| 2009/0109533 A1* | 4/2009 | Laganas et al. | 359/503 |
| 2010/0165322 A1* | 7/2010 | Kane et al. | 356/4.01 |
| 2010/0172020 A1* | 7/2010 | Price et al. | 359/381 |
| 2011/0001958 A1* | 1/2011 | Bridges et al. | 356/4.01 |
| 2011/0310476 A1* | 12/2011 | Russ | 359/412 |

* cited by examiner

RANGEFINDER

CROSS REFERENCE TO RELATED APPLICATIONS

This Application claims priority of Taiwan Patent Application No. 099100007, filed on Jan. 4, 2010, the entirety of which is incorporated by reference herein.

BACKGROUND OF THE INVENTION

1. Field of the Invention

The invention relates to a rangefinder, and more particularly to a rangefinder with a receiving member that can be easily adjusted to a focal point on an optical axis.

2. Description of the Related Art

There are many types of rangefinders, e.g. a laser meter.

The laser meter comprises a laser source, an emission lens, a receiving lens, and a receiving member. When the laser meter performs a range finding operation, the laser source emits a red laser with a wavelength of 650 nm. The red laser is first collimated into nearly parallel laser beams by the emission lens. The laser beams are then reflected by a target. The receiving lens receives the reflected laser beams and focuses the reflected laser beams on the receiving member. Next, the laser beams received by the receiving member are processed, thereby obtaining the distance of the target.

Specifically, to focus the reflected laser beams on the receiving member, the position of the receiving lens must be adequately adjusted. More specifically, the position of the receiving lens must be adjusted in multiple directions (such as, X, Y, and Z directions), exactly locating the focal point thereof on an optical axis and the receiving member. Accordingly, the reflected laser beams can be precisely focused on the receiving member, thereby calculating the precise distance of the target. Nevertheless, because the position of the receiving lens must be adjusted in the multiple directions, range finding operation of the laser meter is inconvenient. Moreover, the laser meter further comprises a receiving lens chamber receiving the receiving lens. The receiving lens is fixed in the receiving lens chamber by adhesive. Here, as the receiving lens is fixed in the receiving lens chamber by the adhesive, combination therebetween is insecure. Accordingly, after the laser meter is used for a length of time, combination between the receiving lens and the receiving lens chamber weakens. Thus, the laser meter needs to be examined and repaired. Here, being required to be detached from the receiving lens chamber during examination and repair of the laser meter, the receiving lens is easily damaged, thereby incurring additional costs.

BRIEF SUMMARY OF THE INVENTION

A detailed description is given in the following embodiments with reference to the accompanying drawings.

An exemplary embodiment of the invention provides a rangefinder comprising a main body, a receiving lens, a first adjusting wheel, a second adjusting wheel, a movable board, and a receiving member. The main body comprises a first end and a second end opposite to the first end. The second end comprises at least one guide bar. The receiving lens is connected to the first end of the main body. The first and second adjusting wheels are rotatably connected to the second end of the main body. The movable board is movably fit on the guide bar of the second end of the main body and is disposed between the first and second adjusting wheels. The receiving member is connected to the movable board, receiving light beams received by the receiving lens. The movable board is moved by rotation of the first and second adjusting wheels, driving the receiving member to move on an optical axis.

The first adjusting wheel comprises a first threaded portion. The second adjusting wheel comprises a second threaded portion. The second end of the main body further comprises a third threaded portion engaging the first and second threaded portions.

The receiving member comprises a circuit board and an avalanche photodiode. The avalanche photodiode is connected to the circuit board, receiving the light beams received by the receiving lens.

The rangefinder further comprises an emission light source disposed on the main body. Light beams emitted from the emission light source are reflected by a target and are received by the receiving member via the receiving lens.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
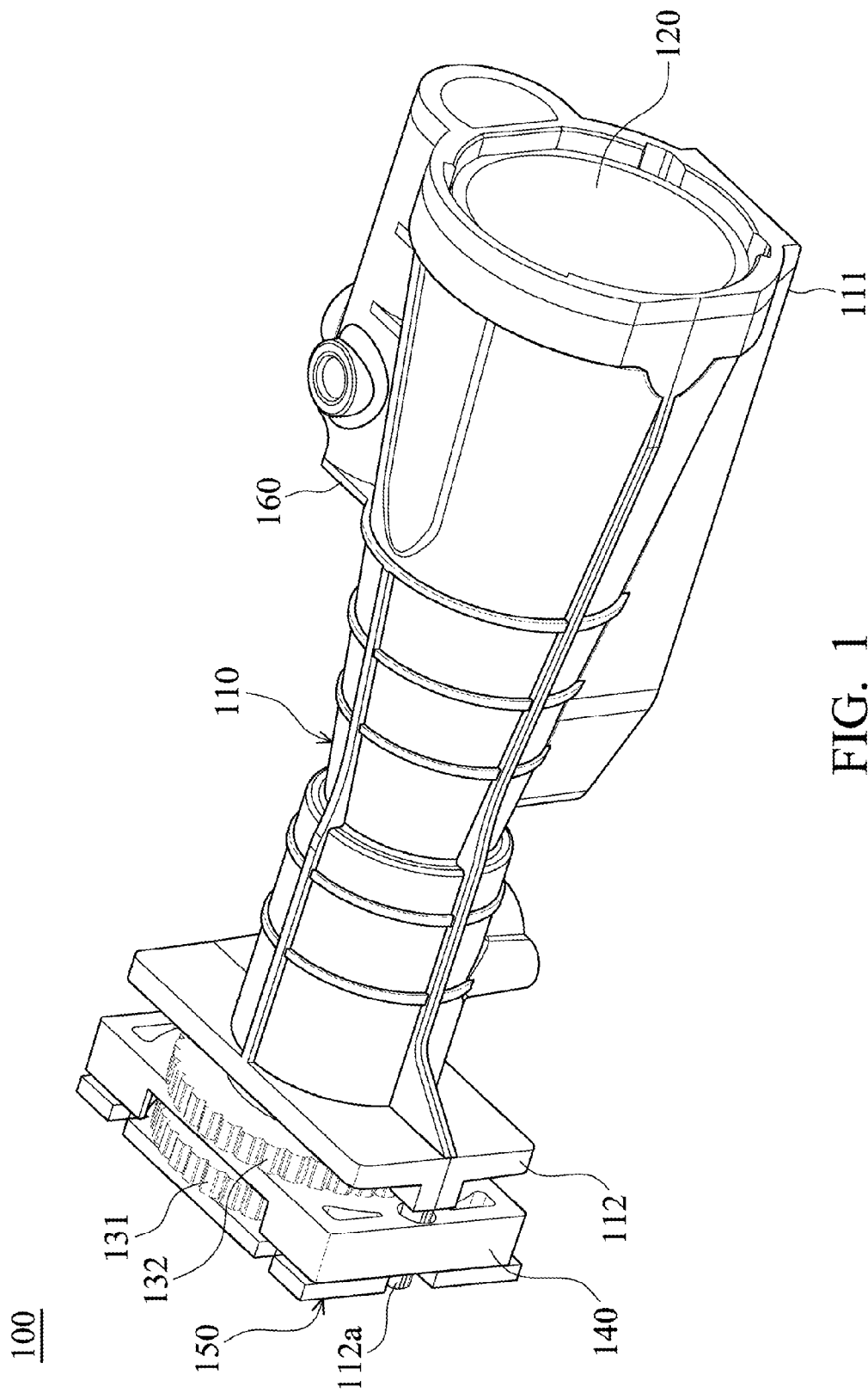
FIG. 1 is a schematic perspective view of a rangefinder of the invention.
Figure 2:
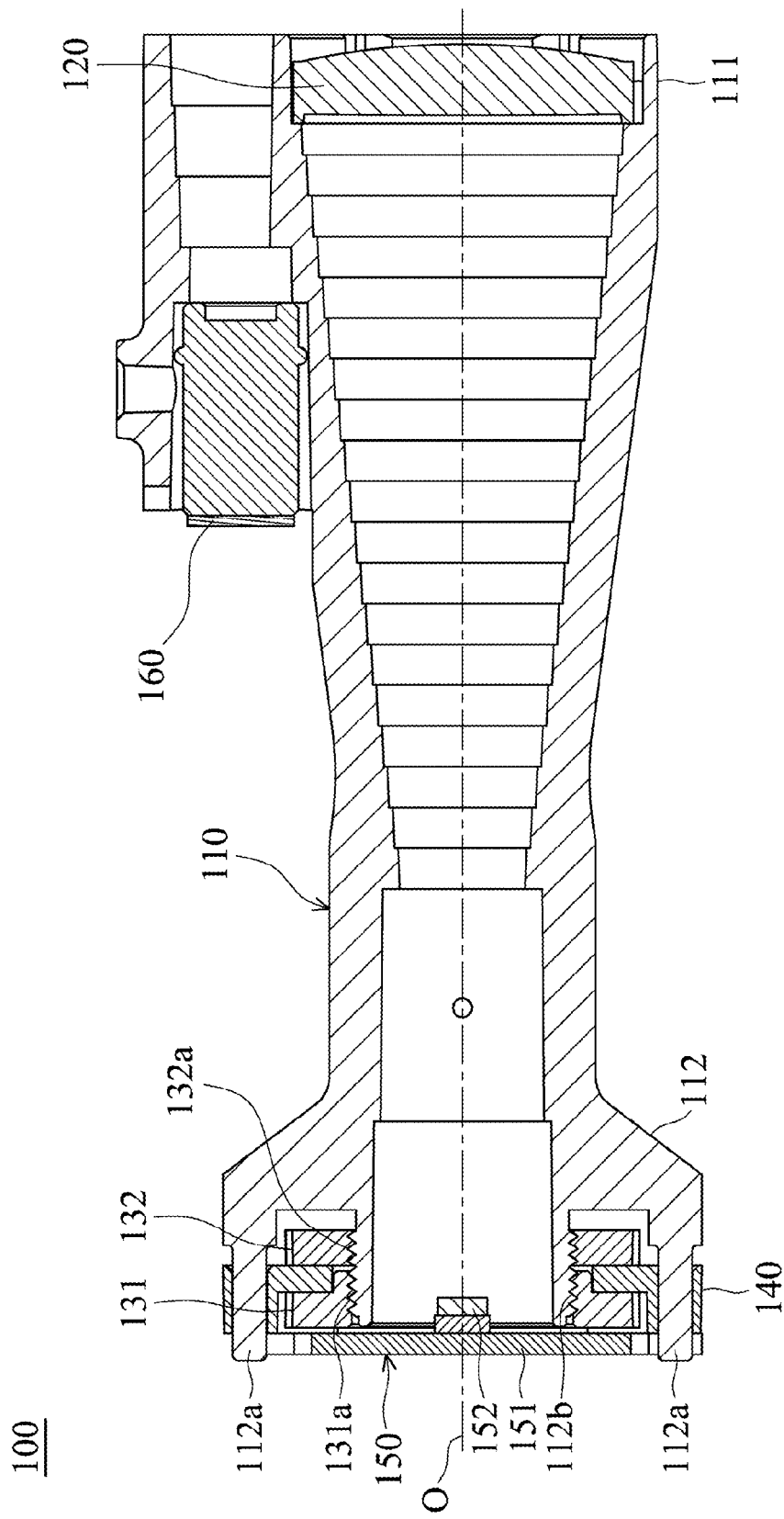
FIG. 2 is a schematic cross section of the rangefinder of the invention.

Referring to FIG. 1 and FIG. 2, a rangefinder 100 comprises a main body 110, a receiving lens 120, a first adjusting wheel 131, a second adjusting wheel 132, a movable board 140, a receiving member 150, and an emission light source 160.

The main body 110 comprises a first end 111 and a second end 112 opposite to the first end 111. Additionally, as shown in FIG. 2, the second end 112 comprises two opposite guide bars 112a and a third threaded portion 112b.

As shown in FIG. 1 and FIG. 2, the receiving lens 120 is connected to the first end 111 of the main body 110.

The first adjusting wheel 131 and second adjusting wheel 132 are rotatably connected to the second end 111 of the main body 110. Specifically, as shown in FIG. 2, the first adjusting wheel 131 comprises a first threaded portion 131a, the second adjusting wheel 132 comprises a second threaded portion 132a, and the first threaded portion 131a and second threaded portion 132a engage the third threaded portion 112b of the second end 112 of the main body 110.

As shown in FIG. 1 and FIG. 2, the movable board 140 is movably fit on the guide bars 112a of the second end 112 of the main body 110 and is disposed between the first adjusting wheel 131 and the second adjusting wheel 132. Specifically, the movable board 140 is abutted between the first adjusting wheel 131 and the second adjusting wheel 132. Thus, by simultaneously rotating the first adjusting wheel 131 and second adjusting wheel 132 in the same direction, the movable board 140 abutted between the first adjusting wheel 131 and the second adjusting wheel 132 can move along an optical axis O (shown in FIG. 2).

The receiving member 150 is connected to the movable board 140, receiving light beams received (or transmitted) by the receiving lens 120. Here, as shown in FIG. 2, the receiving member 150 comprises a circuit board 151 and an avalanche photodiode (APD) 152 connected to the circuit board 151. Specifically, before the receiving member 150 is connected to the movable board 140, the position of the receiving member 150 can be adjusted (in multiple directions perpendicular to the direction of the optical axis O), enabling the avalanche photodiode 152 thereof to be positioned exactly on the optical axis O. When adjustment of the position of the receiving member 150 or avalanche photodiode 152 thereof is complete, the receiving member 150 is connected to the movable board 140. Accordingly, when the movable board 140 is moved along the optical axis O by rotation of the first adjusting wheel 131 and second adjusting wheel 132, the receiving member 150 and avalanche photodiode 152 thereof can move on the optical axis O.

The emission light source 160 is disposed on the main body 110. Here, the emission light source 160 can emit laser beams (or light beams).

The following description is directed to a range finding operation of the rangefinder 100 for a target (not shown).

After the laser beams (or light beams) emitted from the emission light source 160 are reflected by the target, the reflected laser beams (or light beams) are received by the avalanche photodiode 152 of the receiving member 150 via the receiving lens 120. Here, if the avalanche photodiode 152 of the receiving member 150 is not located at the focal point of the receiving lens 120, the first adjusting wheel 131 and second adjusting wheel 132 can be simultaneously rotated to move the avalanche photodiode 152 on the optical axis O, until the avalanche photodiode 152 is moved onto the focal point of the receiving lens 120. Accordingly, the reflected laser beams (or light beams) can be precisely focused on the avalanche photodiode 152. Then, the exact distance of the target can be obtained by operational processing and analysis.

Accordingly, as a precise focusing effect can be achieved (or the position, on the optical axis O, of the avalanche photodiode 152 of the receiving member 150 can be adjusted) by only rotating the first adjusting wheel 131 and second adjusting wheel 132, the range finding operation of the rangefinder 100 is convenient. Moreover, even though the rangefinder 100 is required to be examined and repaired, the receiving lens 120 does not have to be detached therefrom, thereby preventing damage to the receiving lens 120, and further preventing additional costs.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rangefinder, comprising:
   a main body comprising a first end and a second end opposite to the first end, wherein the second end comprises at least one guide bar;
   a receiving lens connected to the first end of the main body;
   a first adjusting wheel rotatably connected to the second end of the main body;
   a second adjusting wheel rotatably connected to the second end of the main body;
   a movable board movably fit on the guide bar of the second end of the main body and disposed between the first and second adjusting wheels; and
   a receiving member connected to the movable board, receiving light beams received by the receiving lens, wherein the movable board is moved by rotation of the first and second adjusting wheels, driving the receiving member to move on an optical axis.

2. The rangefinder as claimed in claim 1, wherein the first adjusting wheel comprises a first threaded portion, the second adjusting wheel comprises a second threaded portion, and the second end of the main body further comprises a third threaded portion engaging the first and second threaded portions.

3. The rangefinder as claimed in claim 1, wherein the receiving member comprises a circuit board and an avalanche photodiode, and the avalanche photodiode is connected to the circuit board, receiving the light beams received by the receiving lens.

4. The rangefinder as claimed in claim 1, further comprising an emission light source disposed on the main body, wherein light beams emitted from the emission light source are reflected by a target and are received by the receiving member via the receiving lens.

* * * * *